(12) United States Patent
Seo

(10) Patent No.: US 6,375,438 B1
(45) Date of Patent: Apr. 23, 2002

(54) TWO-STAGE CENTRIFUGAL COMPRESSOR

(75) Inventor: Un Jong Seo, Inchun-shi (KR)

(73) Assignee: Samjin Co., Ltd. (KR)

( * ) Notice: Subject to any disclaimer, the term of this patent is extended or adjusted under 35 U.S.C. 154(b) by 0 days.

(21) Appl. No.: 09/700,362

(22) PCT Filed: Jun. 15, 2000

(86) PCT No.: PCT/KR00/00209

§ 371 Date: Nov. 14, 2000

§ 102(e) Date: Nov. 14, 2000

(87) PCT Pub. No.: WO00/55506

PCT Pub. Date: Sep. 21, 2000

(30) Foreign Application Priority Data

Mar. 15, 1999 (KR) ............................................. 99-8664

(51) Int. Cl.⁷ ................................................ F04B 35/00
(52) U.S. Cl. ...................................... 417/366; 415/111
(58) Field of Search ................................. 417/366, 365, 417/372; 415/110, 111, 115, 185

(56) References Cited

U.S. PATENT DOCUMENTS 5,555,956 A * 9/1996 Voss et al. ................ 184/6.16
6,070,421 A    6/2000 Petrovich et al.

* cited by examiner

Primary Examiner—Teresa Walberg
Assistant Examiner—Thor Campbell
(74) Attorney, Agent, or Firm—Webb Ziesenheim Logsdon Orkin & Hanson, P.C.

(57) ABSTRACT

The present invention provides a two-stage centrifugal compressor. The compressor of this invention has a simplified refrigerant passage structure and effectively cools its electric motor in addition to bearing parts using an existing refrigeration cycle without having another external cooling unit. This compressor thus reduces a consumption of electric power, and improves the operational performance and operational efficiency of a refrigeration system. In the two-stage centrifugal compressor of this invention, a plurality of internal fluid passages is regularly formed on the internal surface of the upper and lower end portions of an external housing so as to allow first and second compression parts to communicate with each other through the interior space of the external housing. Upper and lower bearing housings are fixedly mounted to the upper and lower ends of the external housing, with a plurality of fluid openings being regularly formed on the bearing housings and communicating with both compression chambers of the first and second compression parts, corresponding to the internal fluid passages of the external housing. The second compression part has the second compression chamber within a compression casing, receiving an inlet part of a diffuser and surrounding outer part thereof and provided with a refrigerant discharging port, and has an internal cover with a fluid passage communicating with the fluid openings of the upper and lower bearing housings.

5 Claims, 10 Drawing Sheets

US 6,375,438 B1

TWO-STAGE CENTRIFUGAL COMPRESSOR

BACKGROUND OF THE INVENTION

1. Field of the Invention

The present invention relates, in general, to a two-stage centrifugal compressor used in refrigeration cycles and, more particularly, to an improvement in such a compressor to allow the electric motor to be cooled by refrigerant of a refrigeration cycle without having another external motor cooler, thus simplifying the refrigerant line of the refrigeration cycle thereby resulting in an improvement in both the operational performance and operational efficiency of the cycle.

2. Background Art

As well known to those skilled in the art, two-stage centrifugal compressors have been typically used in large-scaled refrigeration systems. However, it is necessary in recent days to actively study such a type of compressors to reduce the size of them since it is desired to use them with indoor air conditioners for houses or automobiles.

Conventional two-stage centrifugal compressors for refrigeration systems are composed of an electric motor set at the central portion within a motor housing, with the motor consisting of a rotor and a stator. An impeller having a plurality of blades is set on both ends of a rotating shaft of said rotor. First and second compression parts are provided to the opposite ends of the motor housing. In an operation of a refrigeration system, refrigerant circulates through a main refrigerant line of the system and is compressed at the first and the second compression parts by said impellers of the compressor. The compressed refrigerant from the compression parts passes through the main refrigerant line while absorbing heat from the electric motor and cooling the motor.

In the operation of the refrigeration system, the two-stage centrifugal compressor receives refrigerant from an evaporator and primarily compresses the refrigerant at the first compression part, and secondarily compresses the primarily compressed refrigerant at the second compression part, and so the refrigerant becomes highly heated and highly pressurized gas refrigerant. The gas refrigerant having high temperature and high pressure is fed from the compressor to a condenser. In order to suck refrigerant from the evaporator and to compress the refrigerant, and to circulate the pressurized refrigerant in the refrigeration system during a refrigeration cycle, it is necessary to rotate the electric motor at a high speed. Due to such a high speed rotating motion of the motor, much heat is generated from both the motor and its bearing parts and deteriorates the operational performance of the compressor in addition to a reduction in operational reliability of the compressor.

Therefore, it is necessary to appropriately and effectively cool the motor and the bearing parts. In an effort to accomplish the above object, the construction of both a motor cooling system and a refrigerant line of a two-stage centrifugal compressor has been actively studied. As a result of such active studies, several techniques for cooling the motor and the bearing parts of such a two-stage centrifugal compressor have been proposed as follows.

In a conventional two-stage centrifugal compressor of FIG. 1a, gas refrigerant is sucked from an evaporator into the compressor C through a first refrigerant line $L_1$. In such a case, the refrigerant is primarily compressed at the first compression part $C_1$. The refrigerant is, thereafter, fed into the second compression part $C_2$ of the compressor C through an external refrigerant line $L_2$ so as to be secondarily compressed at that compression part $C_2$, and so the refrigerant becomes highly heated and highly pressurized gas refrigerant. The gas refrigerant, having a high temperature and a high pressure, is fed from the compressor C into a condenser. In the above compressor C, a motor cooling cycle is separately provided in the fixed jacket $M_j$ of the electric motor M. In the motor cooling cycle provided in the jacket $M_j$, refrigerant from the compressor C circulates through another refrigerant line $L_3$ under the control of a separate cooling unit Cu, thus cooling the motor M.

FIG. 1b shows a refrigerant cycle diagram of a conventional two-stage centrifugal compressor according to another embodiment of the prior art. In this compressor C, gas refrigerant is sucked from an evaporator into the compressor C through a first refrigerant line $L_1$. The refrigerant is thus primarily compressed at the first compression part $C_1$ of the compressor C and is secondarily compressed at the second compression part $C_2$ prior to being fed into a condenser in the same manner as that described for the embodiment of FIG. 1a. The condenser condenses the refrigerant so as to convert the phase of the refrigerant from a gas phase into a liquid phase prior to feeding the refrigerant to an evaporator. In this compressor C, a part of the condensed refrigerant is sucked into and flows in the fixed jacket $M_j$ of the electric motor M. The liquid refrigerant is evaporated while flowing in the jacket $M_j$ and is joined to an external refrigerant line $L_4$ prior to being sucked into the second compression part $C_2$ of the compressor C. At the second compression part $C_2$ of the compressor C, the gas refrigerant from the jacket $M_j$ is compressed to become a highly pressurized refrigerant.

FIG. 1c shows a refrigerant cycle diagram of a conventional two-stage centrifugal compressor according to a further embodiment of the prior art. In this compressor C, gas refrigerant is sucked from an evaporator into the compressor C through a first refrigerant line $L_1$ and flows in the interior of the compressor C while cooling the electric motor M. The refrigerant is, thereafter, sucked into the first compression part $C_1$ of the compressor C through an external refrigerant line $L_2$, thus being primarily compressed at that compression part $C_1$. The refrigerant is sucked from the first compression part $C_1$ into the second compression part $C_2$ of the compressor C through the external refrigerant line $L_2$, thus being secondarily compressed at that compression part $C_2$ prior to being fed into a condenser.

FIG. 1d shows a refrigerant cycle diagram of a conventional two-stage centrifugal compressor according to still another embodiment of the prior art. In the embodiment of FIG. 1d, gas refrigerant is sucked from an evaporator into the compressor C through a first refrigerant line $L_1$, and is primarily compressed at the first compression part $C_1$ of the compressor C. The refrigerant is, thereafter, fed into the second compression part $C_2$ of the compressor C through an external refrigerant line $L_2$ so as to be secondarily compressed at that compression part $C_2$, and so the refrigerant becomes highly heated and highly pressurized gas refrigerant. The gas refrigerant, having a high temperature and a high pressure, is fed from the compressor C into a condenser. In the above compressor C, another refrigerant line $L_5$ extends through the interior of the compressor C prior to being joined to the external refrigerant line $L_2$. Gas refrigerant, which is separated from liquid refrigerant at a vapor liquid separator of a refrigeration cycle, flows into the compressor C through the refrigerant line $L_5$. On the other hand, an additional refrigerant line $L_4$ extends through the fixed jacket $M_j$ of the electric motor M prior to being joined to the external refrigerant line $L_2$. The condensed liquid refrigerant from the condenser flows through the refrigerant line $L_4$.

FIG. 1e shows a refrigerant cycle diagram of a conventional two-stage centrifugal compressor according to still another embodiment of the prior art. In the embodiment of FIG. 1e, gas refrigerant is sucked from an evaporator into the first compression part $C_1$ of the compressor C through a first refrigerant line $L_1$, and is primarily compressed at that compression part $C_1$. The refrigerant, thereafter, flows through an external refrigerant line $L_2$ so as to pass through the interior of the compressor C while cooling the electric motor. The refrigerant is, thereafter, fed into the second compression part $C_2$ of the compressor C through the external refrigerant line $L_2$, thus being secondarily compressed at that compression part $C_2$. In this compressor C, gas refrigerant, which is separated from liquid refrigerant at a vapor liquid separator of a refrigeration cycle, flows into the second compression part $C_2$ of the compressor C through an additional refrigerant line $L_5$, thus being secondarily compressed at that compression part $C_2$. The secondarily compressed refrigerant is discharged from the compressor C into a condenser of the refrigeration cycle.

FIG. 1f shows a refrigerant cycle diagram of a conventional two-stage centrifugal compressor according to still another embodiment of the prior art. In the embodiment of FIG. 1f, gas refrigerant is sucked from an evaporator into the first compression part $C_1$ of the compressor C through a first refrigerant line $L_1$, and is primarily compressed at that compression part $C_1$. The refrigerant, thereafter, flows into the second compression part $C_2$ of the compressor C through both the interior of the compressor C and an external refrigerant line $L_2$ thus being secondarily compressed at that compression part $C_2$. In this compressor C, gas refrigerant, which is separated from liquid refrigerant at a vapor liquid separator of a refrigeration cycle, flows into the second compression part C, of the compressor C through another refrigerant line $L_5$, thus being secondarily compressed at that compression part $C_2$. The secondarily compressed refrigerant is, thereafter, discharged from the compressor C into a condenser of the refrigeration cycle.

However, the above-mentioned conventional two-stage centrifugal compressors for refrigeration system have disadvantages as follows. That is, such a compressor C necessarily has a complicated refrigerant passage structure, which allows gas refrigerant to be primarily compressed in the interior of the compressor or at the first compression part $C_1$ of the compressor C and to be fed into the second compression part $C_2$ of the compressor C through an external refrigerant line $L_2$ so as to be secondarily compressed at that compression part $C_2$. Such a refrigerant passage structure forces the compressor C to have additional refrigerant lines $L_3$–$L_5$ in addition to the main refrigerant line $L_1$, which is necessarily provided at the compressor C for sucking, compressing and discharging the refrigerant. Due to such additional refrigerant lines $L_3$–$L_5$, the refrigerant passage structure of such conventional two-stage centrifugal compressors is undesirably complicated since it consists of a plurality of refrigerant lines $L_1$–$L_5$. Such a complicated refrigerant passage structure also disturbs flowing of refrigerant, thus causing a refrigerant pressure loss. As a result, this finally deteriorates the operational performance of such compressors in addition to a reduction in both work efficiency and productivity while producing such compressors.

Another problem experienced in the conventional two-stage centrifugal compressors resides in that the compressors necessarily have a separate motor cooling unit Cu, having its own refrigerant flowing cycle separate from a main refrigeration cycle, so as to cool both the electric motor and mechanical frictional parts of the compressors. This finally increases the production cost of the two-stage centrifugal compressors for refrigeration systems.

BRIEF SUMMARY OF THE INVENTION

Accordingly, the present invention has been made keeping in mind the above problems occurring in the prior art, and an object of the present invention is to provide a two-stage centrifugal compressor, which is designed to primarily compress gas refrigerant at a first compression chamber, or the first compression part, of the compressor and to allow the primarily compressed refrigerant to pass through the interior space of an external housing so as to reach a second compression chamber provided at the upper end of the external housing, and to secondarily compress the refrigerant at the second compression chamber, and which thus has a simplified refrigerant passage structure and effectively cools the electric motor and the bearing parts for the refrigeration cycle without having another external cooling unit and reduces a consumption of electric power, and improves the operational performance and operational efficiency of a refrigeration system.

In order to accomplish the above object, the present invention provides a two-stage centrifugal compressor, comprising an electric motor positioned at the central portion within an external housing, the motor being composed of a fixed Jacket including a stator provided with a coil, and a rotor having a rotor core provided on a rotating shaft at a position opposite to the stator, and rotatably supported by radial gas bearings and thrust gas bearings at upper and lower ends of the rotating shaft, and first and second compression parts provided at the upper and lower ends of the external housing of the motor and respectively having an impeller, further comprising: a plurality of internal fluid passages regularly formed on the internal surface of each of the upper and lower end portions of the external housing so as to allow the first and second compression parts to communicate with each other through the interior space of the external housing; and upper and lower bearing housings fixedly mounted to the upper and lower ends of the external housing, with a plurality of fluid openings being regularly formed on the upper and lower bearing housings and communicating with both compression chambers of the first and second compression parts, corresponding to the internal fluid passages of the external housing. In the two-stage centrifugal compressor, the second compression part has the second compression chamber within a compressing casing, receiving an inlet part of a diffuser and surrounding outer part thereof, provided with a refrigerant discharging port, and has an internal cover with a fluid passage communicating with the fluid openings of the upper and lower bearing housings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
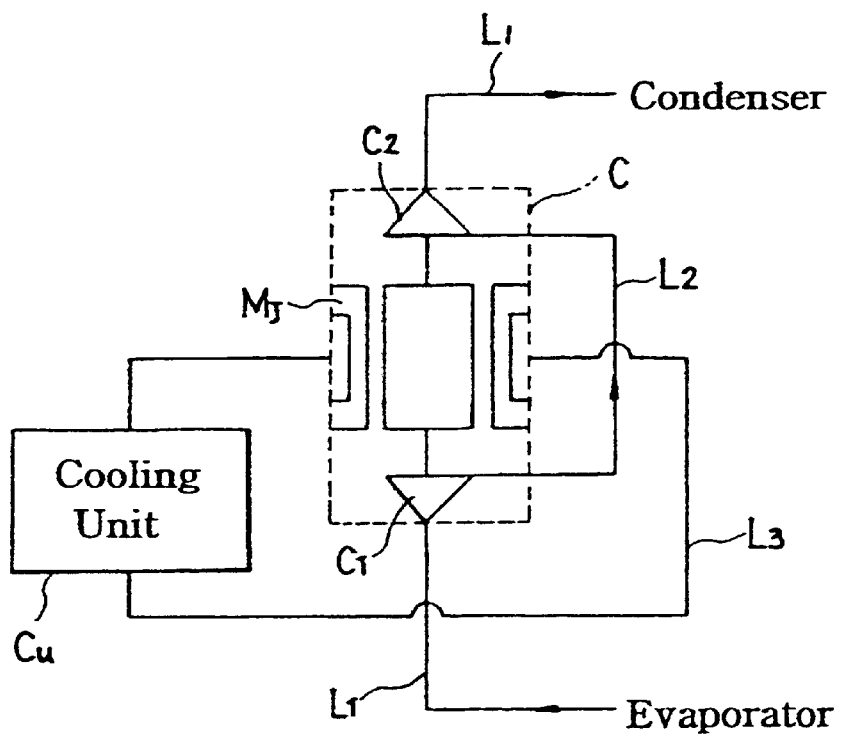
FIGS. 1a to 1f are refrigerant flow cycle diagrams of conventional two-stage centrifugal compressors.
Figure 1B:
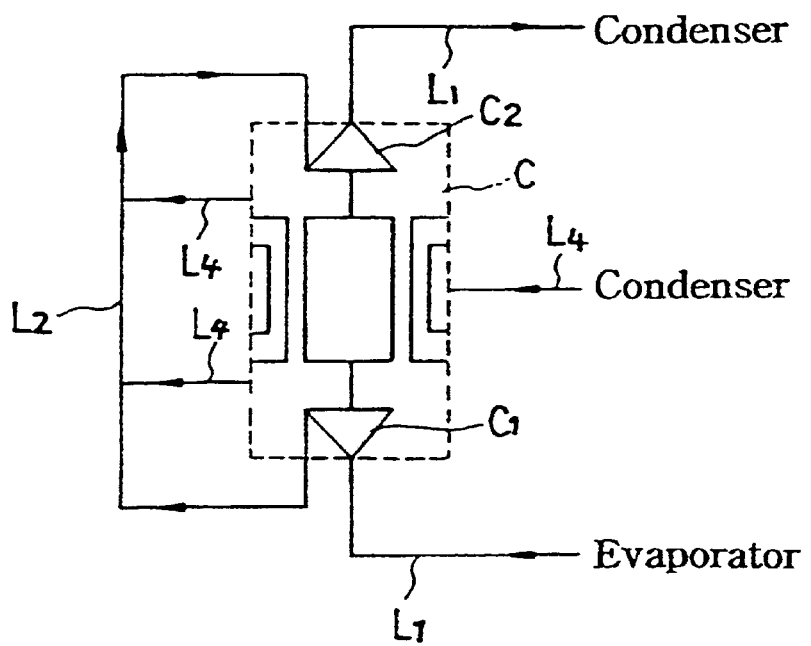
Figure 1C:
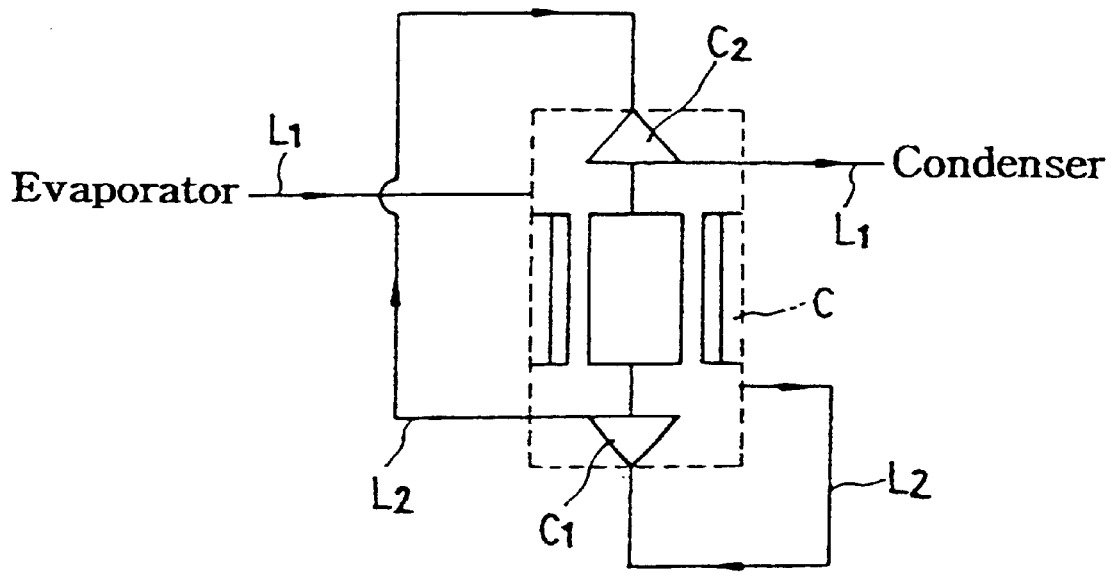
Figure 1D:
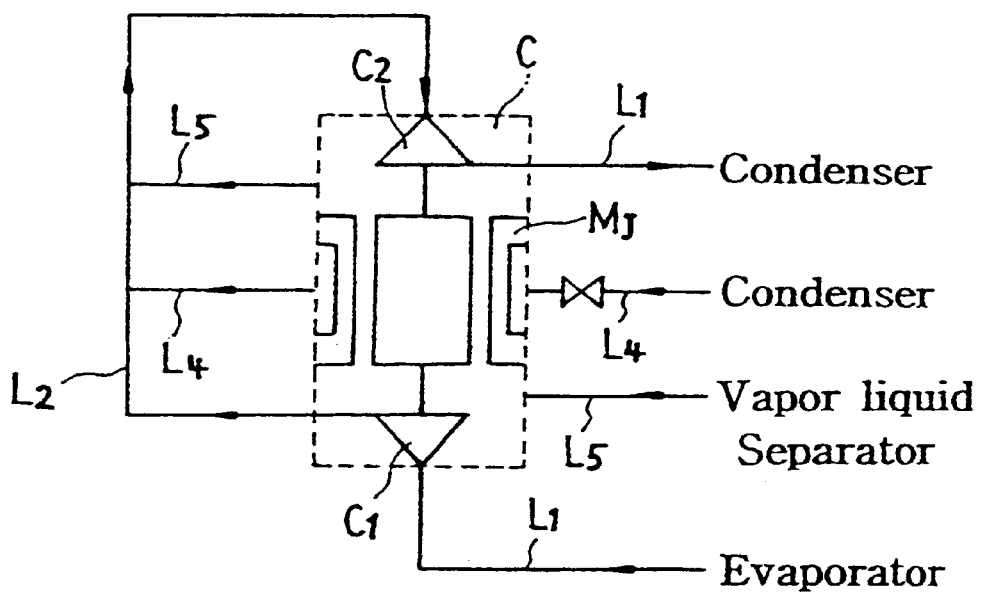
Figure 1E:
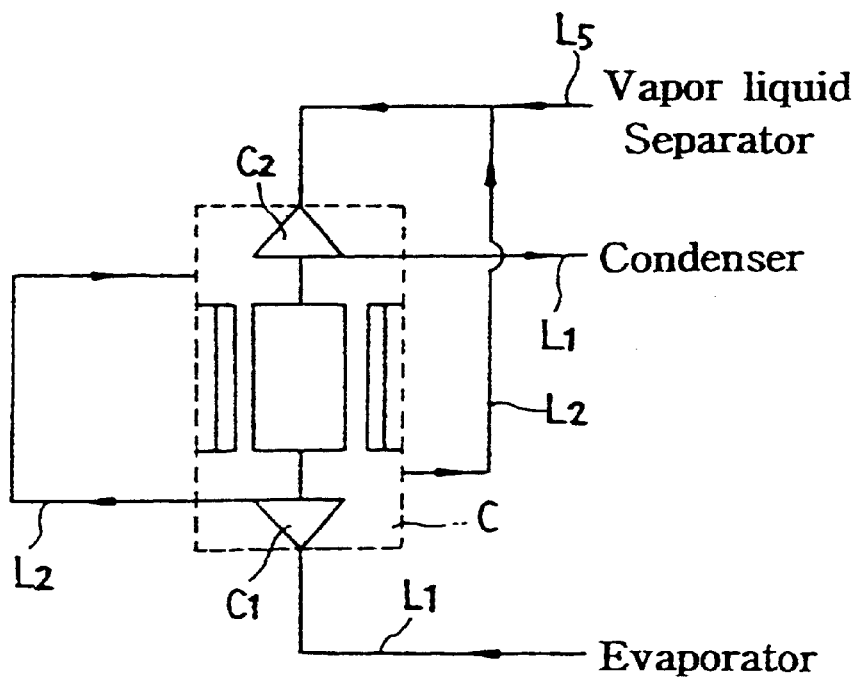
Figure 1F:
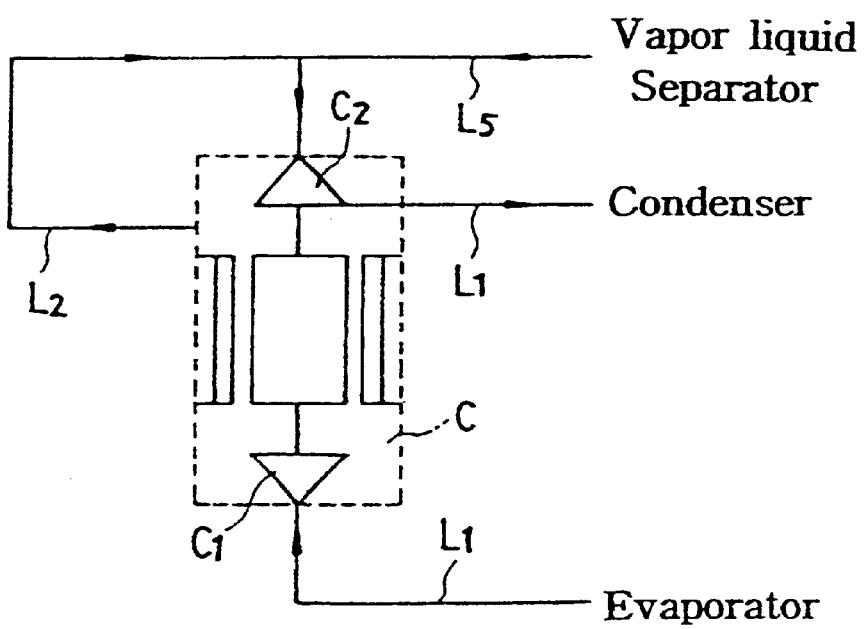
Figure 2:
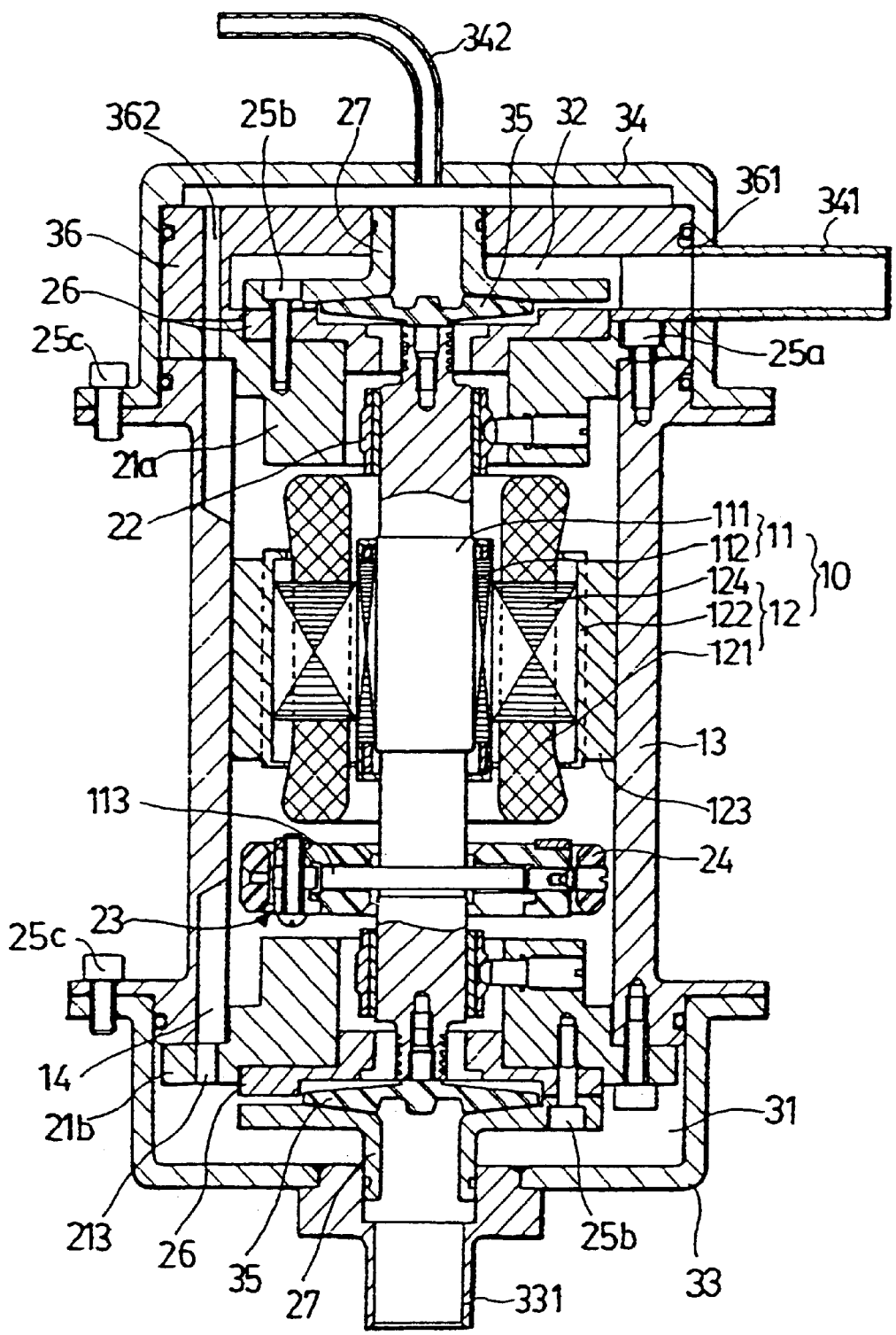
FIG. 2 is a sectional view, showing the construction of a two-stage centrifugal compressor in accordance with the preferred embodiment of the present invention.

FIGS. 2 to 6 are views shows the construction of a two-stage centrifugal compressor in accordance with the preferred embodiment of this invention The two-stage centrifugal compressor of this invention comprises an electric motor 10, which is set at the central portion within the interior of an external housing 13 and generates a rotating force. Upper and lower bearing parts are provided at the upper and lower ends of the external housing 13 and are supported by dynamic gas bearings, thus allowing the rotor 11 to be rotatable at a high speed. The compressor also has first and second compression parts provided at the lower and upper ends of the external housing 13 which primarily and secondarily compress gas refrigerant.

The electric motor 10 comprises the rotor 11 and a stator 12. The rotor 11 is composed of lower and upper impellers 35 of the first and second compression parts, with the two impellers 35 being set on the lower and upper ends of a rotating shaft 111. The stator 12, used for electromagnetically rotating the rotor 11, is interiorly provided with a fixed stator core 124 having a coil 121 and is externally covered with a fixed jacket 122. This stator 12 is fitted into the external housing 13.

Figure 3:
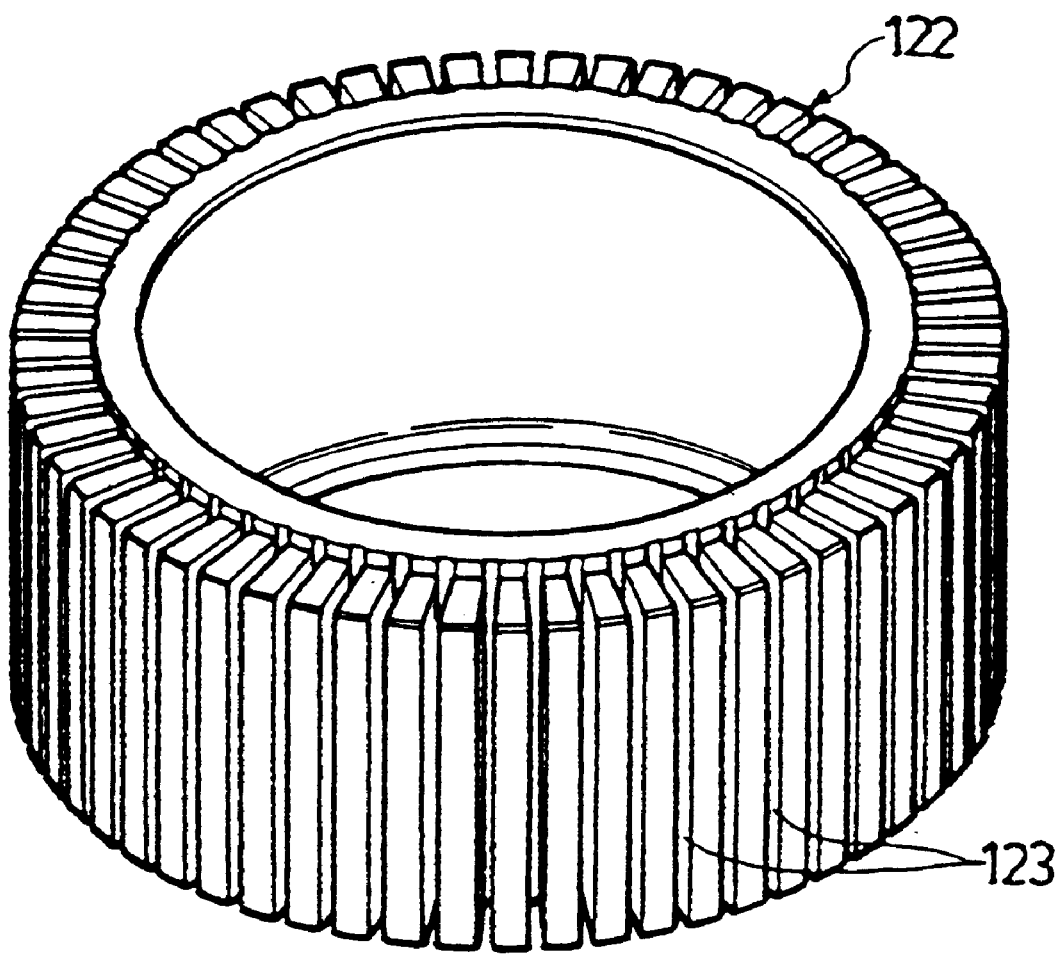
FIG. 3 is a perspective view of a fixed jacket of the two-stage centrifugal compressor of this invention.

As shown in FIG. 3, a plurality of external fluid passages 123 are regularly formed on the external surface of the fixed jacket 122 of the stator 12 and allow refrigerant to flow along the internal surface of the external housing 13. Of course, it should be understood that such external fluid passages 123 may be regularly formed on the internal surface of the external housing 13 in place of the fixed jacket 122 of the stator 12 without affecting the functioning of this invention.

The rotor 11 of the motor 10 has a rotor core 112 that is formed on the rotating shaft 111 at a position opposite to the stator 12. A collar 113 is integrally formed on the lower end portion of the rotating shaft 111 and is supported by a movable bearing unit including a thrust gas bearing 23.

Figure 5A:
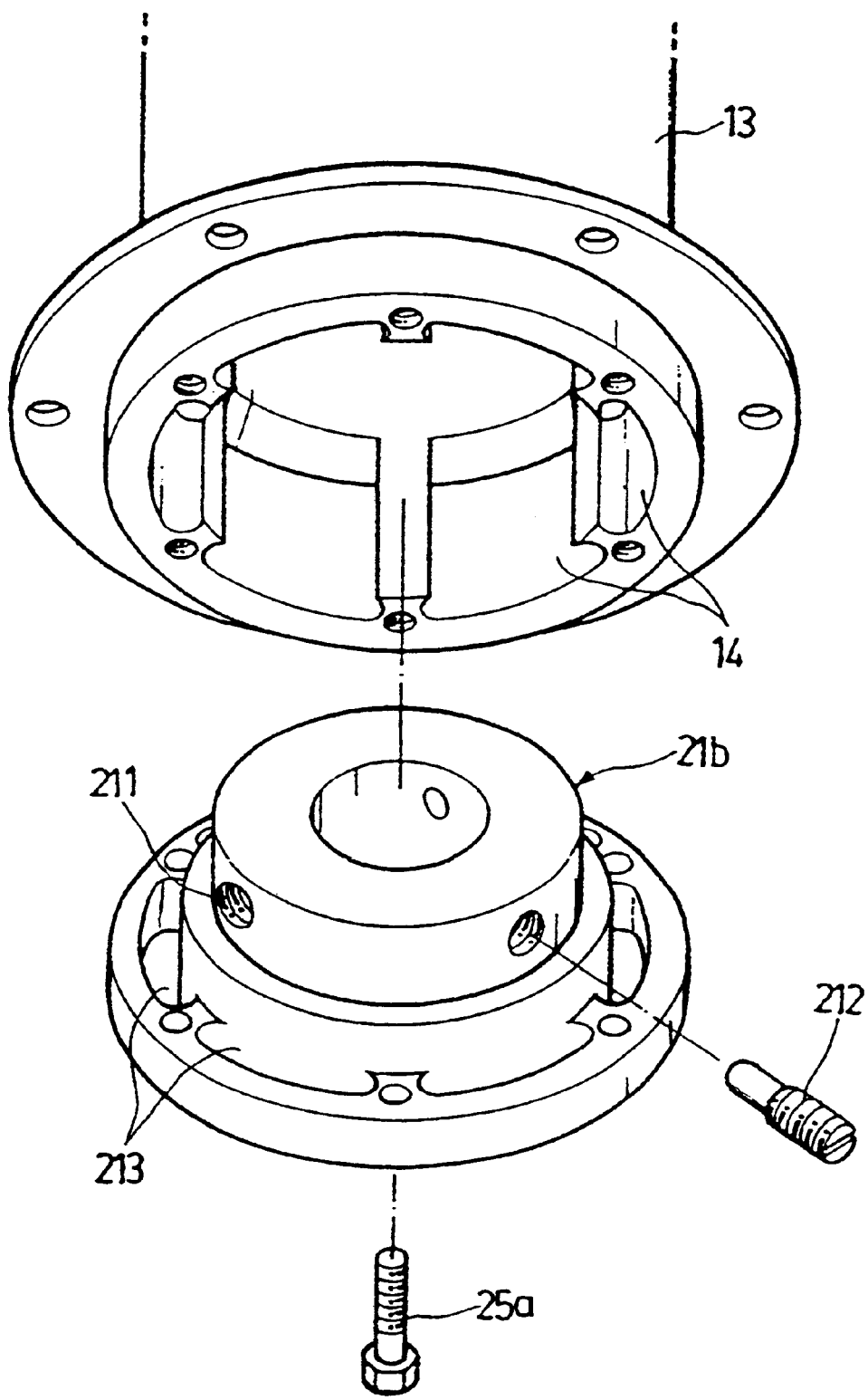
FIG. 5a is an exploded perspective view, showing the construction of both the lower end portion of an external housing and the lower bearing housing of the compressor of this invention.
Figure 5B:
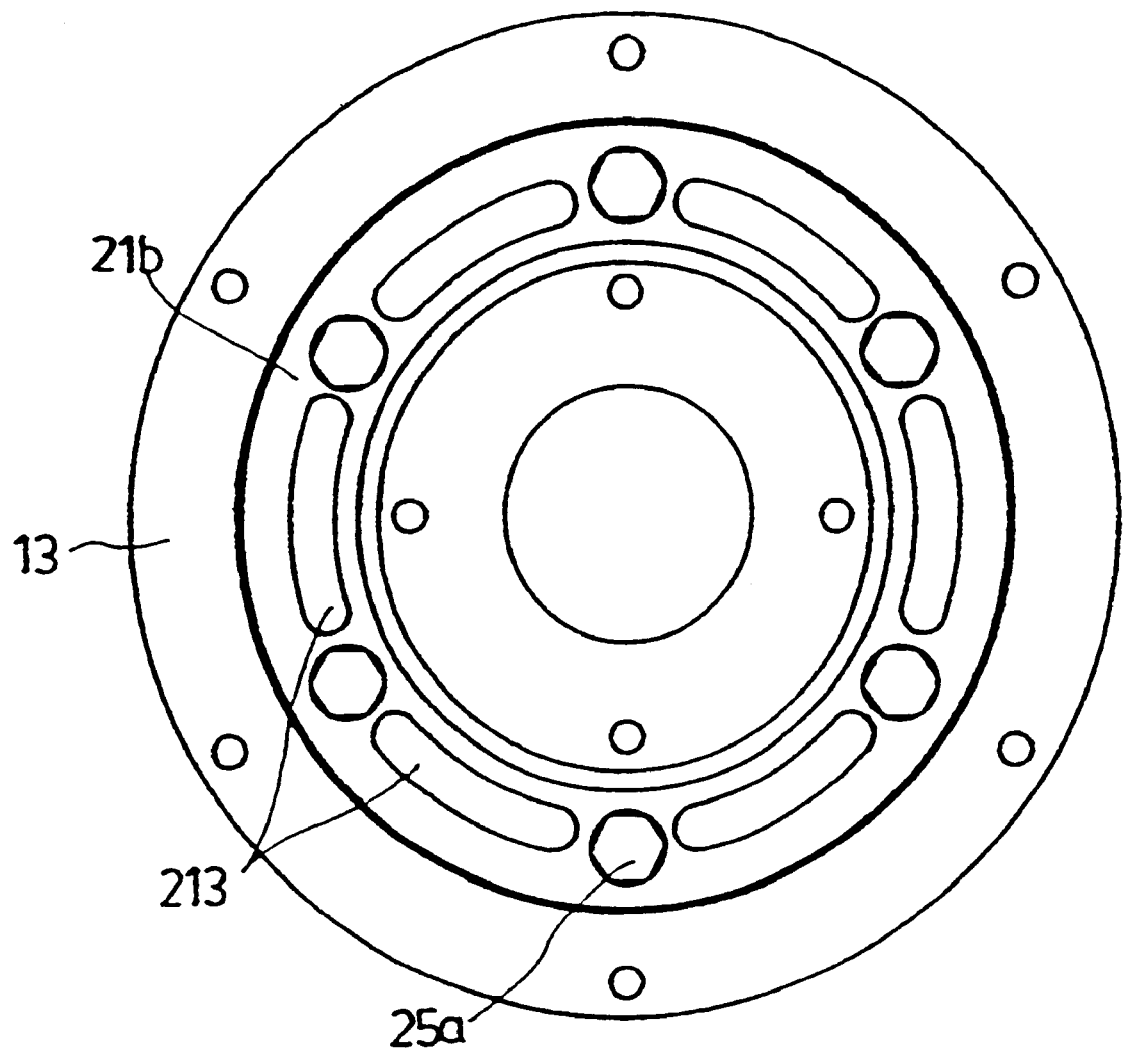
FIG. 5b is a bottom view, showing both the lower end portion of the external housing and the lower bearing housing of the two-stage centrifugal compressor of FIG. 5a when the parts of FIG. 5b are assembled together.

As shown in FIG. 5a, the external housing 13 is a cylindrical body, which totally covers the motor 10 and is open at the first and second compression parts. A plurality of internal fluid passages 14 are regularly formed on the internal surface of each of the upper and lower end portions of the housing 13.

The upper and lower bearing parts are fabricated as follows. That is, the upper and lower ends of the rotating shaft 111 are rotatably supported by radial gas bearings 22 within the upper and lower bearing housings 21a and 21b set in the upper and lower ends of the external housing 13. The thrust gas bearing 23 is fixed to the lower bearing part using a plurality of locking bolts 23e while rotatably covering the collar 113 of the rotating shaft 111. Both the radial gas bearings 22 and the thrust gas bearing 23 are designed to allow the rotating shaft 111 to be rotatable without being mechanically frictioned.

Figure 4:
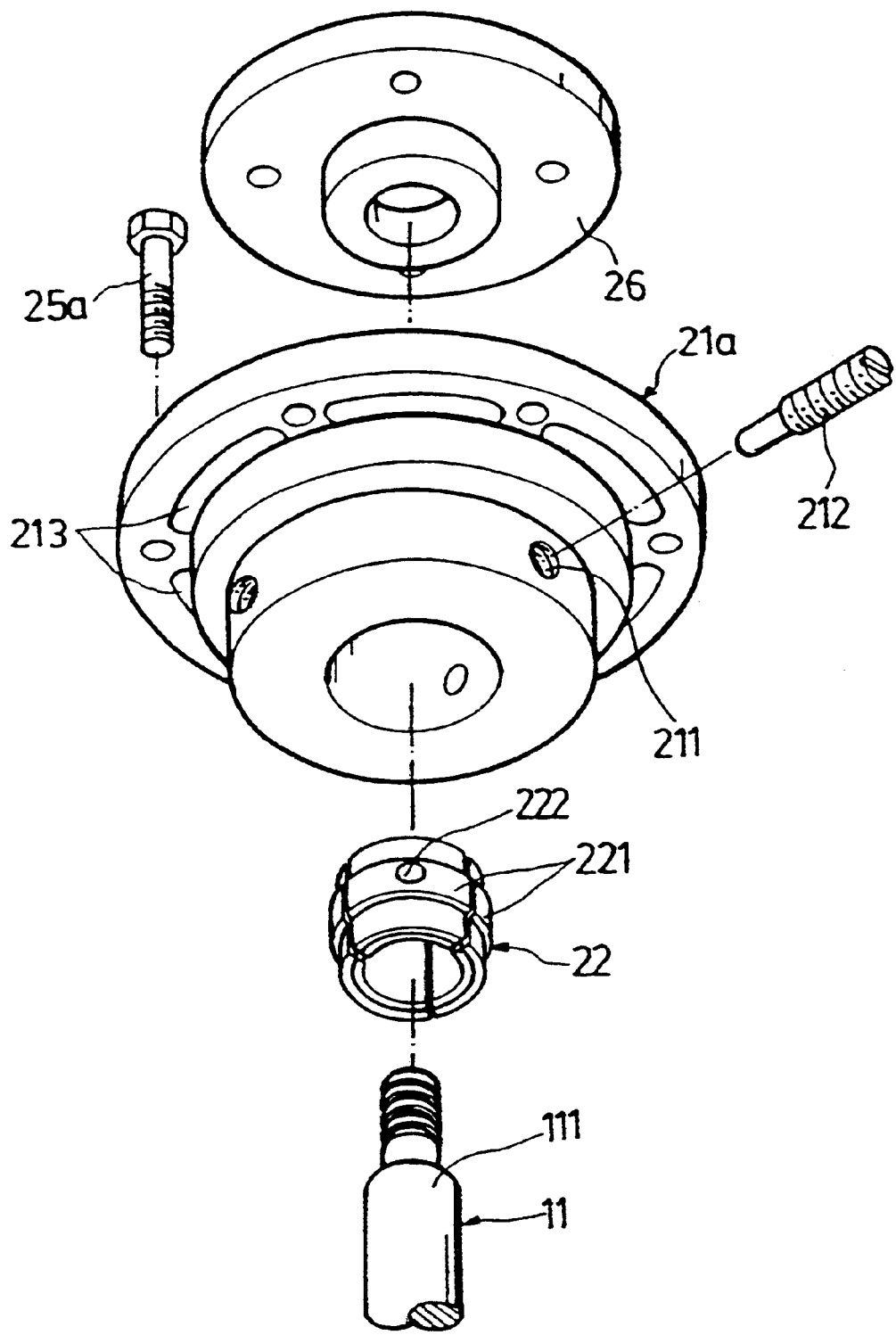
FIG. 4 is an exploded perspective view of upper and lower radial gas bearings included in the compressor of this invention.

On the other hand, the construction of the upper and lower bearing parts, rotatably supporting the upper and lower ends of the rotating shaft 111 relative to the external housing 13, is shown in detail in FIGS. 4 and 5a. As shown in the drawings, the bearing housings 21a and 21b of the upper and lower bearing parts are mounted to the upper and lower ends of the external housing 13 using a plurality of locking bolts 25a In each of the bearing housings 21a and 21b, three screw holes 211 are regularly and radially formed on the external surface of a fitting part while being spaced out at an angle of 120°. At the fitting parts, the bearing housings 21a and 21b are fitted into the upper and lower ends of the cylindrical external housing 13. Three set screws 212 are tightened into the screw holes 211 of each of the two bearing housings 21a and 21b and hold three arcuate pieces 221 forming a radial gas bearing 22 within each of the two bearing housings 21a and 21b.

A plurality of arcuate fluid openings 213 are regularly formed on each of the two bearing housings 21a and 21b. The above fluid openings 213 communicate with the internal fluid passages 14 of the external housing 13 when the two bearing housings 21a and 21b are fitted into the upper and lower ends of the external housing 13. Both a sealing housing 26 and a diffuser 27 are fixedly mounted to each of the two bearing housings 21a and 21b using a plurality of locking bolts 25b, thus forming the first compression chamber 31 at the lower end portion of the housing 13 and the second compression chamber 32 at the upper end portion of the housing 13.

Each of the radial gas bearings 22 is composed of three arcuate pieces 221 having a radius of curvature of 120°. The three pieces 221 form a cylindrical radial gas bearing 22, each has a semicircular hole 222 on its external surface at a position around the central portion.

In each of the radial gas bearings 22, the three arcuate pieces 221 are regularly arranged to cover the rotating shaft 111, with three set screws 212 passing through the screw holes 211 of each bearing housing 21a, 21b prior to being set in the semicircular holes 222 of the three arcuate pieces 221 at their ends.

Figure 6:
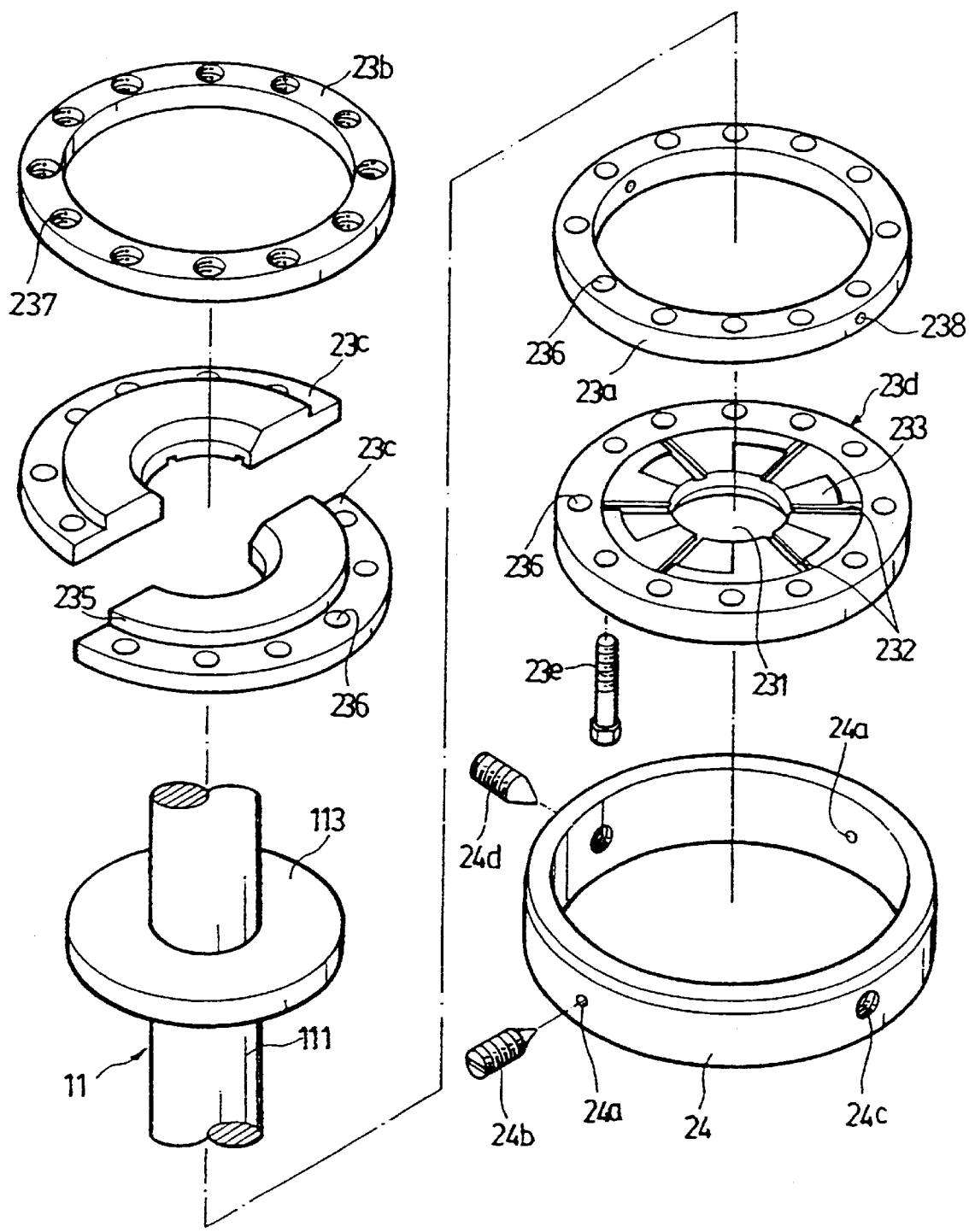
FIG. 6 is an exploded perspective view of a movable bearing part of the compressor of this invention.

FIG. 6 shows the construction of both the thrust gas bearing 23, used for supporting the collar 113 of the rotating shaft 111, and the movable bearing unit receiving the thrust gas bearing 23.

The above movable bearing unit comprises the thrust bearing 23, which supports the collar 113 of the rotating shaft 111 at a position above the top end of the lower bearing housing 21b. The movable bearing unit also comprises an external ring 24, which receives the thrust gas bearing 23 and rotatably holds the bearing 23 while being freely movable within a predetermined moving range.

The thrust gas bearing 23 is comprises a space ring 23a that is fitted over the collar 113 of the rotating shaft 111. Upper and lower gas bearings 23c and 23d are provided on the upper and lower surfaces of the space ring 23a The space ring 23a and the gas bearings 23c and 23d are fixed to a fixing ring 23b using a plurality of locking bolts 23e.

The upper and lower gas bearings 23c and 23d are arranged on the upper and lower surfaces of the space ring 23a and are respectively provided with a central opening 231 for receiving the rotating shaft 111. A plurality of radial linear grooves 232 are regularly formed on a surface of each gas bearing 23d, at which the bearing 23d is brought into contact with the collar 113 of the rotating shaft 111. A plurality of sectorial wide and shallow depressions 233 are regularly formed on the collar contact surface of gas bearing 23d while communicating with the radial linear grooves 232. Such a depression 233 forms a gas film in the rotating direction of the rotating shaft 111.

The upper gas bearing 23c is composed of two semicircular parts, and so it is possible to improve work efficiency while assembling the parts of the movable bearing unit The central portion of the upper gas bearing 23c around the central opening is bossed upwardly to a height leveled with the height of the zing ring 23b, thus forming an annular boss 235, with the edge of the upper gas bearing 23c being left thin.

A plurality of bolt holes 236 are regularly formed along the edge of each of the upper and lower gas bearings 23c and 23d and the space ring 23a in a way such that the holes 236 of the space ring 23a and the bearings 23c and 23d are formed at corresponding positions of same radius. The upper and lower gas bearings 23c and 23d and the space ring 23a are locked to the collar 113 of the rotating shaft 111 using the locking bolts 23e passing through the bolt holes 236. Regularly formed along the edge of the fixing ring 23b are a plurality of bolt holes 237. These bolt holes 237 are formed at positions corresponding to the bolt holes 236 of both the space ring 23a and the upper and lower gas bearings 23c and 23d, and allow the fixing ring 23b to be assembled with the space ring 23a and the upper and lower gas bearings 23c and 23d using the locking bolts 23e.

The external ring 24 has two radial hinge holes 24a at diametrically opposite positions, and so the ring 24 is rotatably held by the two set screws 24b set on the external housing 13. Two radial screw holes 24c are formed on the external ring 24 at positions angularly spaced from the radial hinge holes 24a at an interval of 90°, with two set screws 24d being tightened to the two screw holes 24c of the ring 24 and being set in the hinge holes 238 of the space ring 23a, thus rotatably holding the thrust gas bearing 23.

The above thrust gas bearing 23 is assembled as follows. That is, the space ring 23a is primarily laid on the lower gas bearing 23d. Thereafter, the rotating shaft 111 is fitted into the central opening 231 of the lower gas bearing 23d downwardly until the lower surface of the collar 113 of the shaft 111 comes into contact with the top surface of the lower gas bearing 23d. The space ring 23a is, thereafter, fitted over the collar 113 of the rotating shaft 111 prior to laying both the upper gas bearing 23c and the fixing ring 23b on the top surfaces of both the space ring 23a and the collar 113. The fixing ring 24b, the upper gas bearing 23c, the space ring 23a and the lower gas bearing 23d are assembled to each other into a single body using a plurality of locking bolts 23e passing through the bolt holes 236 and 237 downwardly.

In order to form the two compression parts, the upper and lower bearing housings 21a and 21b are mounted to the upper and lower ends of the external housing 13, with both a sealing housing 26 and a diffuser 27 fixedly mounted to each of the two bearing housings 21a and 21b so as to form the desired compression parts. An impeller 35, having a plurality of blades, is set on each end of the rotating shaft 111 of the rotor 11, passing through each sealing housing 26, at a position between the sealing housing 26 and the diffuser 27.

Two compression casings 33 and 34 are mounted to the outside of the diffusers 27 and the two bearing housings 21a and 21b using a plurality of locking bolts 25c, thus forming the first and second compression chambers 31 and 32. A refrigerant suction port 331 is formed at the central portion of the lower compression casing 33 and sucks refrigerant into the first compression chamber 31 due to a suction force generated by a rotation of the lower impeller 35. In each of the two compression chambers 31 and 32, the impeller 35 is positioned to face an associated diffuser 27, thus sucking refrigerant through the inlet of the diffuser 27.

Figure 5C:
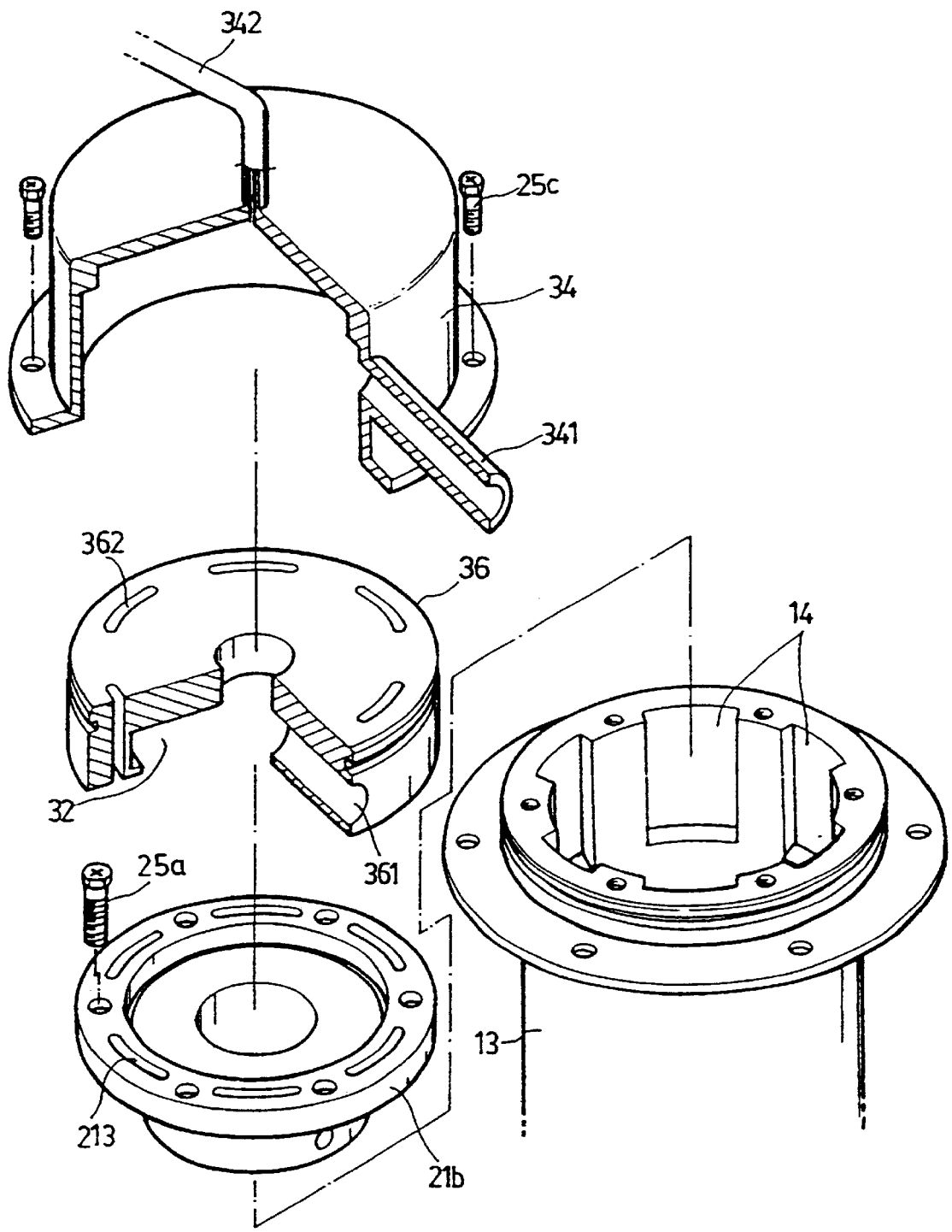
FIG. 5c is a partially sectioned exploded perspective view of a second compression part of the compressor of this invention, with both the sealing housing and the diffuser being removed from the compression part.

A refrigerant discharging port 341 is formed on the upper compression casing 34 of the second compression part and discharges high temperature and high pressure gas refrigerant into a condenser (not shown) of the refrigeration system. A flash pipe 342 is connected to the central portion of the compression casing 34, and so gas refrigerant, separated from liquid refrigerant at a gas liquid separator (not shown), is sucked into the upper compression part As shown in FIG. 5c, the upper compression casing 34 is provided with an internal cover 36, which guides the refrigerant sucked from the interior space of the external housing 13. The internal cover 36 of the upper compression casing 34 also has a compression space for compressing the refrigerant Therefore, the second compression chamber 32 is formed in the upper compression casing 34 while receiving the inlet part of a diffuser 27 and covering the diffuser 27, with a refrigerant discharging port 361 being formed at the second compression chamber 32. A fluid passage 362 is formed in the outside part of the internal cover 36 of the upper compression casing 34 and communicates with the arcuate fluid openings 213 of the upper bearing housing 21a.

The above two-stage centrifugal compressor of this invention is operated as follows. When the coil 121 of the stator 12 of the electric motor 10 is electrically activated, the rotating shaft 111 of the rotor 11 is electromagnetically rotated. When the rotating shaft 111 is rotated as described above, the arcuate pieces 221 of the radial gas bearings 22, provided within the upper and lower bearing housings 21a and 21b and supporting both ends of the shaft 111, are rocked along with the shaft 111 since the pieces 221 are somewhat eccentrically supported by the set screws 212.

When the arcuate pieces 221 are rocked along with the rotation of the shaft 111 as described above, the gas refrigerant, flowing in the interior of the motor 10, is sucked into the gap between the external surface of the shaft 111 and the internal surfaces of the pieces 221, thus forming a gas film in the gap.

When the rotating speed of the rotating shaft 111 reaches a desired rpm, the arcuate pieces 221 are not rocked, but are stopped, and so the pieces 221 smoothly support the shaft 111 while being almost free from coming into frictional contact with the external surface of the shaft 111.

On the other hand, in the thrust gas bearing 23 of the lower bearing housing 21b, the lower surface of the collar 113 of the shaft 111 primarily comes into contact with the top surface of the lower gas bearing 23d as shown in FIG. 6. However, when the collar 113 is rotated, the gas refrigerant, flowing in the interior of the motor 10, is sucked into the sectorial depressions 233 through the radial linear grooves 232 of the gas bearing 23d, thus forming a gas film. Therefore, the collar 113 of the rotating shaft 111 is smoothly rotated while being suspended in the gap between the upper and lower gas bearings 23c and 23d and being almost free from frictional contact.

Therefore, the rotating shaft 111 of the rotor 11 is almost completely free from being undesirably biased downwardly due to a difference of pressure between primarily compressed refrigerant of the first compression chamber 31 and secondarily compressed refrigerant in the second compression chamber 32 or due to weight of the rotor 11. The shaft 111 is also prevented from being undesirably biased to a side or from being undesirably vibrated in the initial stage of the operation of the motor 10.

Due to the radial and thrust gas bearings 22 and 23, the two-stage centrifugal compressor of this invention is free from a mechanical problem at a portion around the rotating shaft 111 of the motor 10, and so it is possible to improve the operational reliability of the compressor. In addition, the compressor of is invention is smoothly operated without being troubled in a variety of operational modes from a low speed operational mode of about 3,500 rpm to a super high speed operational mode of about 60,000 rpm.

When the rotating shaft 111 of the rotor 11 is rotated at such a super high speed, the motor 10 inevitably generates heat. However, in the compressor of this invention, the primarily compressed gas refrigerant is introduced from the first compression chamber 31, provided at the lower portion of the external housing 13, into the interior of the housing 13 through both the arcuate fluid openings 213 and the internal fluid passages 14. In the external housing 13, the gas refrigerant desirably absorbs heat from the coil 121 of the stator 12 and cools the stator 12 while passing through the gap between the stator 12 and the rotor core 112 of the rotor 11 and through the external fluid passages 123 formed on the external surface of the fixing jacket 122 covering the stator 12.

The gas refrigerant in the interior of the external housing 13 is also sucked into the radial gas bearings 22 of the upper and lower bearing housings 21a and 21b, and is partially sucked from the upper and lower surfaces of the collar 113 of the rotating shaft 111 into both the radial grooves 232 and the sectorial depressions 233 of the upper and lower gas bearings 23c and 23d. The gas refrigerant thus desirably absorbs heat from the upper and lower bearing parts and absorbs heat from the thrust gas bearing 23, thereby effectively cooling them.

As described above, the primarily compressed gas refrigerant of the first compression chamber 31 is introduced into the external housing 13 through both the arcuate fluid openings 213 of the lower bearing housing 21b and the internal fluid passages 14 of the housing 13, and cools the upper and lower bearing parts in addition to the motor 10 while passing through them. It is thus possible to prevent the motor 10 from being overheated and to allow the motor 10 to be always optimally operated during an operation of the compressor.

When the motor 10 is operated as described above, the two impellers 35, provided at upper and lower ends of the shaft 111, are rotated at a high speed along with the shaft 111. Gas refrigerant is thus sucked into the lower compression casing 33 through the refrigerant suction port 331 of the casing 33 due to a suction force of the lower impeller 35 and is introduced into the first compression chamber 31 through both the lower impeller 35 and the lower diffuser 27. The gas refrigerant is primarily compressed within the first compression chamber 31.

The primarily compressed gas refrigerant is discharged from the compression chamber 31 into the external housing 13 through both the arcuate fluid openings 213 of the lower bearing housing 21b and the internal fluid passages 14 of the housing 13. Within the external housing 13, the primarily compressed gas refrigerant passes through the upper and lower bearing parts in addition to the motor 10 prior to flowing into the upper compression casing 34 of the second compression part. In such a case, the primarily compressed gas refrigerant passes through the internal fluid passages 14 of the housing 13, the arcuate fluid openings 213 of the upper bearing housing 21a and the fluid passage 362 of the internal cover 36 prior to reaching the upper compression casing 34.

In the second compression part, the gas refrigerant flows into the second compression chamber 32 of the internal cover 36 after passing through the compression casing 34, the inlet port of the diffuser 27 and the impeller 35. The primarily compressed gas refrigerant is thus secondarily compressed within the second compression chamber 32 due to the suction force generated by the rotation of the upper impeller 35. The secondarily compressed gas refrigerant is, thereafter, discharged from the compression chamber 32 into a condenser (not shown) of the refrigeration cycle through the refrigerant discharging port 341 of the upper compression casing 34.

As described above, the present invention provides a two-stage centrifugal compressor. The compressor of this invention is designed to primarily compress gas refrigerant at a first compression chamber, or the first compression part, provided at the lower end of the compressor. This compressor also allows the primarily compressed refrigerant to pass through the interior space of an external housing so as to reach a second compression chamber provided at the upper end of the external housing. The primarily compressed refrigerant is secondarily compressed at the second compression chamber prior to being discharged into a condenser of a refrigeration cycle. The two-stage centrifugal compressor of this invention thus has a simplified refrigerant passage structure and effectively cools its electric motor in addition to upper and lower bearing parts using an existing refrigeration cycle without having another external cooling unit different from conventional two-stage centrifugal compressors. Therefore, this compressor reduces a consumption of electric power, and improves the operational performance and operational efficiency of a refrigeration system.

The present invention is preferably adapted to refrigerant compressors for refrigeration systems, and is preferably used with refrigerators or air conditioners.

What is claimed is:

1. A two-stage centrifugal compressor, comprising a first and a second compression part, each having an impeller therein and being located at an upper and a lower end of an external housing, an electric motor being located at a central inner part of the external housing, a rotating shaft of the electric motor being supported by radial gas bearings and thrust gas bearings, and a stator of the electric motor being attached to a fixed jacket located at an inner surface of the external housing, wherein a plurality of internal fluid passages are formed on an internal surface of each of the upper and the lower end of the external housing; a plurality of openings is formed on bearing housings located at the upper and the lower end of the external housing corresponding to the plurality of internal fluid passages of the external housing in order for the compression parts to communicate with an interior of the external housing; and a plurality of fluid passages is formed on an external surface of the fixed jacket, so that a primarily compressed gas refrigerant in the first compression part can flow to the second compression part through the interior of the external housing while cooling the electric motor.

2. The two-stage centrifugal compressor according to claim 1, wherein the second compression part has a second compression chamber within a compression casing, receiving an inlet part of a diffuser and surrounding outer part thereof, provided with a refrigerant discharging port, and has an internal cover with a fluid passage communicating with the plurality of fluid openings of the upper and lower bearing housings.

3. The two-stage centrifugal compressor according to claim 2, wherein the internal cover is fixed to the upper end of the external housing along with the compression casing using a plurality of locking bolts, thus forming a space between a top end surface of the internal cover and an interior surface of the compression casing.

4. The two-stage centrifugal compressor according to claim 1, wherein a flash pipe is connected to a compression casing of the second compression part and communicates with a gas liquid separator of a refrigeration cycle.

5. The two-stage centrifugal compressor according to claim 2, wherein a flash pipe is connected to the compression casing of the second compression part and communicates with a gas liquid separator of a refrigeration cycle.

* * * * *

UNITED STATES PATENT AND TRADEMARK OFFICE
CERTIFICATE OF CORRECTION

PATENT NO.   : 6,375,438 B1
DATED          : April 23, 2002
INVENTOR(S) : Un Jong Seo It is certified that error appears in the above-identified patent and that said Letters Patent is hereby corrected as shown below:

Title page,
Item [22], PCT Filed, "Jun. 15, 2000" should read -- Mar. 15, 2000 --.

Column 3,
Line 37, "part C, of" should read -- part $C_2$ of --.

Column 4,
Line 29, "fixed Jacket" should read -- fixed jacket --.

Column 5,
Line 24, after "of this invention" insert period -- . --.

Column 6,
Line 15, between "25*a*" and "In" insert period -- . --.

Column 7,
Line 12, after "bearing unit" insert period -- . --.
Line 15, "zing ring" should read -- fixing ring --.

Column 8,
Line 18, after "compression part" insert period -- . --.
Line 23, after "the refrigerant" insert period -- . --.

Column 9,
Line 13, "of is invention" should read -- of this invention --.

Signed and Sealed this

Eighth Day of October, 2002

*Attest:*

JAMES E. ROGAN
*Attesting Officer*     *Director of the United States Patent and Trademark Office*